US012783645B2

(12) United States Patent
Khanna

(10) Patent No.: US 12,783,645 B2
(45) Date of Patent: *Nov. 3, 2026

(54) SYSTEMS AND METHODS FOR USING VECTOR MODEL NORMAL EXCLUSION IN NATURAL LANGUAGE PROCESSING TO CHARACTERIZE A CATEGORY OF MESSAGES

(71) Applicant: Fortinet, Inc., Sunnyvale, CA (US)

(72) Inventor: Sameer Khanna, Cupertino, CA (US)

(73) Assignee: FORTINET, INC., Sunnyvale, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/901,473

(22) Filed: Sep. 30, 2024

(65) Prior Publication Data

US 2025/0094570 A1 Mar. 20, 2025

Related U.S. Application Data

(63) Continuation of application No. 17/570,196, filed on Jan. 6, 2022, now Pat. No. 12,164,628.

(Continued)

(51) Int. Cl.

*G06F 40/10* (2020.01)
*G01V 1/01* (2024.01)

(Continued)

(52) U.S. Cl.

CPC .............. *G06F 21/552* (2013.01); *G01V 1/01* (2024.01); *G01W 1/10* (2013.01); *G06F 18/24* (2023.01);

(Continued)

(58) Field of Classification Search

None

See application file for complete search history.

(56) References Cited

U.S. PATENT DOCUMENTS

| | | | | |
|---|---|---|---|---|
| 7,440,947 | B2 * | 10/2008 | Adcock | G06F 40/30 |
| 7,756,535 | B1 * | 7/2010 | Diao | H04L 51/212<br>709/206 |
| 8,364,766 | B2 * | 1/2013 | Zheng | G06N 7/01<br>709/224 |
| 9,774,626 | B1 * | 9/2017 | Himler | H04L 63/1483 |

(Continued)

FOREIGN PATENT DOCUMENTS

| | | | | |
|---|---|---|---|---|
| CN | 107861939 A | * | 3/2018 | G06F 40/30 |
| CN | 111079427 A | * | 4/2020 | G06F 18/24 |

OTHER PUBLICATIONS

Machine translation of CN-111079427-A (Year: 2020).*

(Continued)

*Primary Examiner* — Richard Z Zhu

(74) *Attorney, Agent, or Firm* — Jaffery Watson Hamilton & DeSanctis LLP

(57) ABSTRACT

Systems, devices, and methods are disclosed in relation to a vector space model that may be used to characterize a category of messages. In one of many possible implementations, the frequency of words found within a piece of text is determined. These frequencies are compared against the frequencies of words within a given corpus like the Oxford English Corpus by first converting the frequencies to probabilities via the inverse cumulative distribution function assuming a normal distribution of frequencies then via taking the absolute difference in frequencies. A small difference reduces the weight of the given word whereas a large weight increases the weight of the word, leading to excellent word ranking for automated feature selection filtering without the need for a negative corpus.

22 Claims, 9 Drawing Sheets

Related U.S. Application Data

(60) Provisional application No. 63/235,887, filed on Aug. 23, 2021.

(51) Int. Cl.

| | |
|---|---|
| ***G01W 1/10*** | (2006.01) |
| ***G06F 18/24*** | (2023.01) |
| ***G06F 21/31*** | (2013.01) |
| ***G06F 21/55*** | (2013.01) |
| ***G06F 21/62*** | (2013.01) |
| ***G06F 40/242*** | (2020.01) |
| ***G06F 40/279*** | (2020.01) |
| ***G06F 40/284*** | (2020.01) |
| ***G06N 7/01*** | (2023.01) |
| ***G06Q 20/38*** | (2012.01) |
| ***G06Q 40/02*** | (2023.01) |
| ***G06Q 40/08*** | (2012.01) |
| ***G06V 10/56*** | (2022.01) |
| ***G06V 10/764*** | (2022.01) |
| ***G06V 10/776*** | (2022.01) |
| ***G06V 40/20*** | (2022.01) |
| ***H04L 9/40*** | (2022.01) |
| ***H04L 43/045*** | (2022.01) |
| *G06F 40/157* | (2020.01) |
| *G06F 40/205* | (2020.01) |
| *G06F 40/295* | (2020.01) |
| *G06F 40/30* | (2020.01) |
| *G06Q 50/26* | (2012.01) |

(52) U.S. Cl.

CPC ........ *G06F 21/316* (2013.01); *G06F 21/6218* (2013.01); *G06F 40/242* (2020.01); *G06F 40/279* (2020.01); *G06F 40/284* (2020.01); *G06N 7/01* (2023.01); *G06Q 20/389* (2013.01); *G06Q 40/02* (2013.01); *G06Q 40/08* (2013.01); *G06V 10/56* (2022.01); *G06V 10/764* (2022.01); *G06V 10/776* (2022.01); *G06V 40/20* (2022.01); *H04L 43/045* (2013.01); *H04L 63/1416* (2013.01); *H04L 63/1425* (2013.01); *G06F 40/157* (2020.01); *G06F 40/205* (2020.01); *G06F 40/295* (2020.01); *G06F 40/30* (2020.01); *G06Q 50/26* (2013.01)

(56) References Cited

U.S. PATENT DOCUMENTS

| | | | | |
|---|---|---|---|---|
| 9,912,687 | B1 * | 3/2018 | Wescoe | H04L 63/1433 |
| 10,372,714 | B2 * | 8/2019 | Beller | G06F 16/9535 |
| 11,062,089 | B2 * | 7/2021 | Yan | G06F 16/355 |
| 11,210,300 | B2 * | 12/2021 | Ignatyev | G06Q 10/00 |
| 11,288,297 | B2 * | 3/2022 | Milenova | G06F 16/313 |
| 11,379,220 | B2 * | 7/2022 | Sobran | G06F 11/3082 |
| 11,520,817 | B2 * | 12/2022 | Andrassy | G06F 16/355 |
| 11,729,198 | B2 * | 8/2023 | Kuppa | H04L 63/1433 726/25 |
| 2005/0060643 | A1 * | 3/2005 | Glass | H04L 51/212 715/205 |
| 2017/0193291 | A1 * | 7/2017 | Lucchese | G06F 40/284 |
| 2019/0266242 | A1 * | 8/2019 | Arumugam | G06F 40/30 |
| 2022/0255950 | A1 * | 8/2022 | Dedenok | H04L 51/08 |

OTHER PUBLICATIONS

Machine translation of CN-107861939-A (Year: 2018).*

Abien Fred Agarap and Paul Grafilon. 2018. Statistical analysis on e-commerce reviews, with sentiment classification using bidirectional recurrent neu-ral network (rnn). arXiv preprint arXiv:1805.03687.

Hadeer, Ahmed. Issa Traore and Sherif Saad, 2017, Detection of online fake news using n-gram anal-ysis and machine learning techniques. In Interna-tional conference on intelligent, secure, and depend-able systems in distributed and cloud environments, pp. 127-138. Springer. (Abstract).

Hadeer Ahmed, Issa Traore, and Sherif Saad. 2018. Detecting opinion spams and fake news using text classification. Security and Privacy, 1(1):e9. (Abstract).

Bandar Alghamdi, Fahad Alharby, et al. 2019. An intelligent model for online recruitment fraud detection. Journal of Information Security, 10(03):155.

Maik Anderka, Benno Stein, and Nedim Lipka. 2011. Detection of text quality flaws as a one-class classification problem. In Proceedings of the 20th ACM international conference on Information and knowledge management, pp. 2313-2316. (Abstract).

Yeshwanth Balachander and Teng-Sheng Moh. 2018. Ontology based similarity for information technology skills. In 2018 IEEE/ACM International Conference on Advances in Social Networks Analysis and Mining (ASONAM), pp. 302-305. IEEE. (Abstract).

John H Beattie and Mark P Richards. 1994. Separation of metallothionein iso forms by micellar electrokinetic capillary chromatography. Journal of Chro-matography A, 664(1):129-134. (Abstract).

Thorsten Brants and Alex Franz. 2006. 1t 5-gram version 1.0. Linguistic Data Consortium.

Rhodessa J Cascaro, Bobby D Gerardo, and Ruji P Medina. 2019. Aggregating filter feature selection methods to enhance multiclass text classification. In Proceedings of the 2019 7th International Conference on Information Technology: IoT and Smart City, pp. 80-84. (Abstract).

Pratik Chattopadhyay, Lipo Wang, and Yap-Peng Tan. 2018. Scenario-based insider threat detection from cyber activities. IEEE Transactions on Computa-tional Social Systems, 5(3):660-675. (Abstract).

Chandler Davis. 1954. Theory of positive linear dependence. American Journal of Mathematics, 76(4):733-746.

Francois Denis, Anne Laurent, Remi Gilleron, and Marc Tommasi. 2003. Text classification and co-training from positive and unlabeled examples. In Proceedings of the ICML 2003 workshop: the con-tinuum from labeled to unlabeled data, pp. 80-87.

Jacob Devlin, Ming-Wei Chang, Kenton Lee, and Kristina Toutanova. 2018. Bert: Pre-training of deep bidirectional transformers for language understand-ing. arXiv preprint arXiv:1810.04805.

Giacomo Domeniconi, Gianluca Moro, Roberto Pasolini, and Claudio Sartori. 2015. A comparison of term weighting schemes for text classification and sentiment analysis with a supervised variant of tf. idf. In International Conference on Data Manage-ment Technologies and Applications, pp. 39-58. Springer.

George Forman. 2008. Bns feature scaling: an improved representation over tf-idf for svm text classifi-cation. In Proceedings of the 17th ACM conference on Information and knowledge management, pp. 263-270.

George Forman et al. 2003. An extensive empirical study of feature selection metrics for text classifica-tion. J. Mach. Learn. Res., 3(Mar):1289-1305.

Joshua Glasser and Brian Lindauer. 2013. Bridgingthe gap: A pragmatic approach to generating insider threat data. In 2013 IEEE Security and Privacy Workshops, pp. 98-104. IEEE.

Nicolas Goix, Nicolas Drougard, Romain Brault, and Mael Chiapino. 2017. One class splitting criteria for random forests. In Asian Conference on Machine Learning, pp. 343-358. PMLR.

Google. 2019. Google colaboratory. Ari Aulia Hakim, Alva Erwin, Kho I Eng, Maulahikmah Galinium, and Wahyu Muliady. 2014. Automated document classification for news article in bahasa indonesia based on term frequency inverse document frequency (tf-idf) approach. In 2014 6th international conference on information technology and electrical engineering (ICITEE), pp. 1-4. IEEE.

Kathryn Hempstalk, Eibe Frank, and Ian H Witten. 2008. One-class classification by combining density and class probability estimation. In Joint European Conference on Machine Learning and Knowledge Discovery in Databases, pp. 505-519. Springer.

Chenlong Hu, Yukun Feng, Hidetaka Kamigaito, Hiroya Takamura, and Manabu Okumura. 2021. One-class text classification with multi-modal deep sup-port vector data description. In Proceedings of the 16th Conference of the European Chapter of the Association

(56) References Cited

OTHER PUBLICATIONS for Computational Linguistics: Main Volume, pp. 3378-3390, Online. Association for Computational Linguistics.
Erel Joffe, Emily J Pettigrew, Jorge R Herskovic, Charles F Bearden, and Elmer V Bernstam. 2015. Expert guided natural language processing using one-class classification. Journal of the American Medical Informatics Association, 22(5):962-966.
Karen Sparck Jones. 1972. A statistical interpretation of term specificity and its application in retrieval. Journal of documentation.
Donghwa Kim, Deokseong Seo, Suhyoun Cho, and Pilsung Kang. 2019a. Multi-co-training for docu-ment classification using various document represen-tations: Tf-idf, Ida, and doc2vec. Information Sci-ences, 477:15-29.
Jeongrae Kim, Han-Joon Kim, and Hyoungrae Kim.2019b. Fraud detection for job placement using hierarchical clusters-based deep neural networks. Ap-plied Intelligence, 49(8):2842-2861.
Sang-Woon Kim and Joon-Min Gil. 2019. Research paper classi-fication systems based on tf-idf and Ida schemes. Human-centric Computing and Informa-tion Sciences, 9(1):1-21.
Theodora Kousta and Clement S Bellet. Local interpretable model-agnostic explanations for long short-term memory network used for classification of amazon customer reviews, 53 pages, Jul. 26, 2020.
Duc C Le, Sara Khanchi, A Nur Zincir-Heywood, and Malcolm I Heywood. 2018. Benchmarking evolu-tionary computation approaches to insider threat de-tection. In Proceedings of the Genetic and Evolu-tionary Computation Conference, pp. 1286-1293.
Duc C Le and A Nur Zincir-Heywood. 2019. Machine learning based insider threat modelling and detec-tion. In 2019 IFIP/IEEE Symposium on Integrated Network and Service Management (IM), pp. 1-6. IEEE.
Thanh-Dung Le, Rita Noumeir, Jerome Rambaud, Guillaume Sans, and Philippe Jouvet. 2021. Ma-chine learning based on natural language processing to detect cardiac failure in clinical narratives. arXiv preprint arXiv:2104.03934.
Kathy Lee, Diana Palsetia, Ramanathan Narayanan,Md Mostofa Ali Patwary, Ankit Agrawal, and Alok Choudhary. 2011. Twitter trend-ing topic classifica-tion. In 2011 IEEE 11th International Confer-ence on Data Mining Workshops, pp. 251-258. IEEE.
Xiaoxin Lin. 2020. Sentiment analysis of e-commerce customer reviews based on natural language process-ing. In Proceedings of the 2020 2nd International Conference on Big Data and Artificial Intelligence, pp. 32-36.
Cai-zhi Liu, Yan-xiu Sheng, Zhi-qiang Wei, and Yong-Quan Yang. 2018. Research of text classification based on improved tf-idf algorithm. In 2018 IEEE International Conference of Intelligent Robotic and Control Engineering (IRCE), pp. 218-222. IEEE.
Fei Tony Liu, Kai Ming Ting, and Zhi-Hua Zhou. 2008. Isolation forest. In 2008 eighth IEEE international conference on data min-ing, pp. 413-422. IEEE.
Syed Mahbub and Eric Pardede. 2018. Using contextual features for online recruitment fraud detection.
Larry M Manevitz and Malik Yousef. 2001. One-classs vms for document classification. Journal of ma-chine Learning research, 2(Dec):139-154.
Justin Martineau and Tim Finin. 2009. Delta tfidf: An improved feature space for sentiment analysis. In Proceedings of the Interna-tional AAAI Conference on Web and Social Media, vol. 3.
Fanzhi Meng, Fang Lou, Yunsheng Fu, and ZhihongTian. 2018. Deep learning based attribute clas-sification insider threat detection for data security. In 2018 IEEE Third International Conference on Data Science in Cyberspace (DSC), pp. 576-581. IEEE.
Francesco Moramarco, Damir Juric, Aleksandar Savkov, and Ehud Reiter. 2021. Towards objec-tively evaluating the quality of generated medical summaries. arXiv preprint arXiv:2104.04412.
MTSamples. Collection of transcribed medical transcription sample reports and examples.
F. Pedregosa, G. Varoquaux, A. Gramfort, V. Michel, B. Thirion, O. Grisel, M. Blondel, P. Prettenhofer,R. Weiss, V. Dubourg, J. Vanderplas, A. Passos, D. Cournapeau, M. Brucher, M. Perrot, and E. Duchesnay. 2011. Scikit-learn: Machine learning in Python. Journal of Machine Learning Research, 12:2825-2830.
Jeffrey Pennington, Richard Socher, and Christopher D. Manning. 2014. Glove: Global vectors for word rep-resentation. In Proceed-ings of the 2014 conference on empirical methods in natural language process-ing (EMNLP), pp. 1532-1543.
PromptCloud. 2017. Us jobs kaggle dataset.CR Rao and Venkat N Gudivada. 2018. Computational analysis and understanding of natural languages: Principles, methods and applications. Elsevier, 5 pages, abstract.
M Niharika Reddy, T Mamatha, and A Balaram. 2018.Analysis of e-recruitment systems and detecting e-recruitment fraud. In International Conference on Communications and Cyber Physical Engineering 2018, pp. 411-417. Springer.
Lukas Ruff, Yury Zemlyanskiy, Robert Vandermeulen, Thomas Schnake, and Marius Kloft. 2019. Self-attentive, multi-context one-class classification for unsupervised anomaly detection on text. In Proceed-ings of the 57th Annual Meeting of the Association for Computational Linguistics, pp. 4061-4071.
Atul Sajjanhar, Yong Xiang, et al. 2019. Image-based feature representation for insider threat classifica-tion. arXiv preprint arXiv:1911.05879.
Kwang-Kyu Seo. 2007. An application of one class support vector machines in content-based im-age retrieval. Expert Systems with Applications, 33(2):491-498.
Pinky Sitikhu, Kritish Pahi, Pujan Thapa, and Subarna Pinky Sitikhu, Kritish Pahi, Pujan Thapa, and Subarna Shakya. 2019. A comparison of semantic similar-ity methods for maximum human interpretability. In 2019 artificial intelligence for transforming business and society (AITB), vol. 1, pp. 1-4. IEEE.
Frank Stappen. 2020. Motion and manipulation lecture series. Utrecht University, downloaded on Oct. 3, 2024, 4 pages.
Hao Sun, Tao Jiang, and Yugang Dai. 2019. Sentiment analysis of commodity reviews based on multilayer Istm network. In Proceed-ings of the International Conference on Artificial Intelligence, Information Processing and Cloud Computing, pp. 1-5. (Abstract attached).
Rachael Tatman. 2017. 1 million most frequent english words on the web. Kaggle. https://www.kaggle.com/datasets/rtatman/english-word-frequency, 5 pages.
Bruno Trstenjak, Sasa Mikac, and Dzenana Donko.2014. Knn with tf-idf based framework for text cat-egorization. Procedia Engineering, 69:1356-1364.
Aaron Tuor, Samuel Kaplan, Brian Hutchinson, Nicole Nichols, and Sean Robinson. 2017. Deep learning for unsupervised insider threat detection in structured cybersecurity data streams. arXiv preprint arXiv:1710.00811.
Guido Zuccon, Daniel Kotzur, Anthony Nguyen, and Anton Bergheim. 2014. De-identification of health records using anonym: Effectiveness and robustness across datasets. Artificial intelligence in medicine, 61(3):145-151.
Sokratis Vidros, Constantinos Kolias, Georgios Kambourakis, and Leman Akoglu. 2017. Automatic detection of online recruitment frauds: Characteristics, methods, and a public dataset. Future Internet, 9(1):6.
Sida I Wang and Christopher D Manning. 2012. Baselines and bigrams: Simple, good sentiment and topic classification. In Proceedings of the 50th Annual Meeting of the Association for Computational Linguistics (vol. 2: Short Papers), pp. 90-94.
Yichen Wei, Kam-Pui P Chow, and Siu-Ming Yiu. 2021. Insider threat prediction based on unsupervised anomaly detection scheme for proactive forensic investigation. Digital Investigation.
Shuwei Xiao and Weiqin Tong. 2021. Prediction of user consumption behavior data based on the combined model of TF-IDF and logistic regression. Journal of Physics: Conference Series, 1757(1):012089.
Wen Zhang, Taketoshi Yoshida, and Xijin Tang. 2011. A comparative study of tf idf, Isi and multi-words for text classification. Expert Systems with Applications, 38(3):2758-2765.
Ling Zhuang and Honghua Dai. 2006. Parameter estimation of one-class svm on imbalance text classification. In Conference of the Canadian Society for Computational Studies of Intelligence, pp. 538-549. Springer.

(56) References Cited

OTHER PUBLICATIONS

Oxford. 2011. The oec: Facts about the language. Oxford English Dictionary, 3 pages, downloaded Oct. 30, 2024.

* cited by examiner

SYSTEMS AND METHODS FOR USING VECTOR MODEL NORMAL EXCLUSION IN NATURAL LANGUAGE PROCESSING TO CHARACTERIZE A CATEGORY OF MESSAGES

CROSS REFERENCE TO RELATED APPLICATIONS

This application is a continuation of U.S. patent application Ser. No. 17/570,196, filed Jan. 6, 2022, which claims the benefit of U.S. Provisional Application No. 63/235,887, filed Aug. 23, 2021. Each of the foregoing applications are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

Field

Embodiments discussed generally relate to systems and methods for characterizing a category of natural language messages based in part on unique word normal exclusion.

BACKGROUND

Large numbers of spam emails are sent. In an ideal world, it would be possible to investigate all emails and remove every instance of spam. However, querying the content of emails can be expensive in terms of processing time and latency, and such querying suffers from significant inaccuracies. These limitations result in considerable numbers of spam emails making it through spam filters.

Thus, there exists a need in the art for more advanced approaches, devices, and systems for querying text and determining which should be identified as undesirable.

SUMMARY

Various embodiments provide systems and methods for characterizing a category of natural language messages based in part on unique word normal exclusion.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
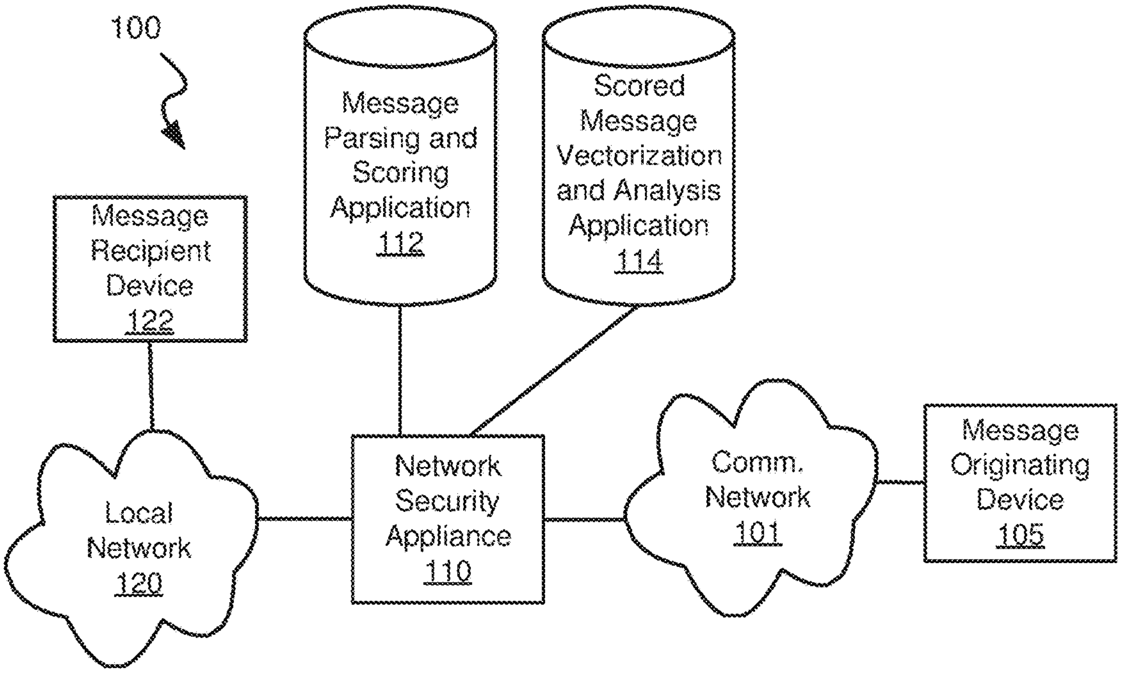
FIGS. 1A-1C illustrate a network architecture including a text based message categorization system in accordance with some embodiments.

Various embodiments provide systems and methods for characterizing a category of natural language messages based in part on unique word normal exclusion.

In the era of the rapid development of computers and the Internet, information on a wide range of topics is pervasive. The amount of text based data is ever increasing in size, magnitude, and variety. Whether it is for e-commerce, clinical diagnosis determination, or fake news detection, it has become increasingly important to have efficient mechanisms for automate identification and classification of text based information sets to allow for orderly and effective data processing. Some embodiments discussed herein provide a one class classification of text based information sets that allow for identification of text of a particular form from a potentially non-exhaustible set of potential topics. In some such embodiments, normal exclusion is applied to received, text based information sets directed at one category classification. Such normal exclusion results in a re-framing of bi-normal separation usage for the one category classification. In some cases, a processing efficient conical classification is applied.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "text based information set" is used in its broadest sense to mean any information set that includes at least a portion of natural language text. As such, text based information sets may include, but are not limited to, text messages, emails, documents, or the like. Based upon the disclosure provided herein, one of ordinary skill in the art will recognize a variety of "text based information sets" to which systems and/or methods described herein may be applied.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for characterizing a category of messages. Such methods include: accessing, by a processing resource, a plurality of model messages of a defined category, wherein each of the plurality of model messages includes text content; calculating, by the processing resource, a normal exclusion value for each unique word in each of the plurality of model messages, where the normal exclusion value for each unique word is calculated based upon a frequency of the particular unique word in the particular message and a frequency of the unique word in a dictionary; forming, by the processing resource, a model message vector for each of the plurality of model messages to yield a plurality of model message vectors, where each of the model message vectors within the plurality of model message vectors corresponds to a particular model message within the plurality of model messages and includes at least a portion of the normal exclusion values calculated for the particular model message; and identifying, by the processing resource, the largest value in a first dimension within the plurality of model message vectors as a first category extreme, and the largest value in a second dimension within the plurality of model message vectors as a second category extreme.

In some instances of the aforementioned embodiments, the dictionary includes more than one hundred thousand unique words and corresponding frequencies of the unique words. In various instances of the aforementioned embodiments, the dictionary is the Oxford English Corpus™. In some cases, the dictionary is maintained in a look-up table.

In various instances of the aforementioned embodiments, the normal exclusion value is calculated in accordance with the following equation:

$$NE = \left|F^{-1}(tpr + \varepsilon) - F^{-1}(\text{Dictionary[selected unique word]} + \varepsilon)\right|,$$

where $F^{-1}$ is an inverse normal cumulative distribution function, tpr is the frequency of occurrence of the selected unique word in the selected message, ε is a small number to prevent the undefined case of $F^{-1}$ (0), and Dictionary [selected unique word] is the frequency of the unique word in a dictionary.

In some instances of the aforementioned embodiments, the methods further include generating a vector definition for the category of messages represented by the plurality of model messages. In such methods, forming the model message vector for each of the plurality of model messages to yield the plurality of model message vectors includes forming the model message vector for each of the plurality of model messages consistent with the vector definition. In some cases. The vector definition includes a position for each normal exclusion value for each unique word found across all of the plurality of model messages. In various cases, the vector definition includes a position for a subset of each normal exclusion value for each unique word found across all of the plurality of model messages.

In some instances of the aforementioned embodiments, identifying the largest value in the first dimension within the plurality of model message vectors includes comparing a first dimension value from each of the plurality of model message vectors to determine which is the largest. In some instances of the aforementioned embodiments, identifying the largest value in the second dimension within the plurality of model message vectors includes comparing a second dimension value from each of the plurality of model message vectors to determine which is the largest.

Other embodiments provide systems for characterizing a category of messages. The systems include a processing resource and a non-transitory computer-readable medium. The non-transitory computer-readable medium is coupled to the processing resource, and has stored therein instructions that when executed by the processing resource cause the processing resource to: access a plurality of model messages of a defined category, where each of the plurality of model messages includes text content; calculate a normal exclusion value for each unique word in each of the plurality of model messages, where the normal exclusion value for each unique word is calculated based upon a frequency of the particular unique word in the particular message and a frequency of the unique word in a dictionary; form a model message vector for each of the plurality of model messages to yield a plurality of model message vectors, where each of the model message vectors within the plurality of model message vectors corresponds to a particular model message within the plurality of model messages and includes at least a portion of the normal exclusion values calculated for the particular model message; and identify the largest value in a first dimension within the plurality of model message vectors as a first category extreme, and the largest value in a second dimension within the plurality of model message vectors as a second category extreme. In some instances of the aforementioned embodiments, the non-transitory computer-readable medium further includes the dictionary as a look-up table.

Yet other embodiments provide non-transitory computer-readable storage media embodying a set of instructions, which when executed by a processing resource, causes the processing resource to: access a plurality of model messages of a defined category, where cach of the plurality of model messages includes text content; calculate a normal exclusion value for cach unique word in each of the plurality of model messages, where the normal exclusion value for each unique word is calculated based upon a frequency of the particular unique word in the particular message and a frequency of the unique word in a dictionary; form a model message vector for each of the plurality of model messages to yield a plurality of model message vectors, where each of the model message vectors within the plurality of model message vectors corresponds to a particular model message within the plurality of model messages and includes at least a portion of the normal exclusion values calculated for the particular model message; and identify the largest value in a first dimension within the plurality of model message vectors as a first category extreme, and the largest value in a second dimension within the plurality of model message vectors as a second category extreme.

Turning to FIG. 1A, network architecture 100 is shown in accordance with some embodiments. In the context of network architecture 100, a network security appliance 110 controls access to network elements within a local network 120. Local network 120 may be any type of communication network known in the art. Those skilled in the art will appreciate that, local network 120 can be a wireless network, a wired network, or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

A text based information set sent from a message originating device 105 to a message recipient device 122 (one of the network elements within local network 120) via a communication network 101 is processed through network security appliance 110. Communication network 101 may be any type of communication network known in the art. Those skilled in the art will appreciate that, communication network 101 can be a wireless network, a wired network, or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Network security appliance 110 is coupled to computer readable mediums 112, 114. Computer readable medium 112 includes a message parsing and scoring application executable by network security appliance 110 to process received text based information sets; and computer readable medium 114 includes a scored message vectorization and analysis application 114 executable by network security appliance 110 to process received text based information sets.

Figure 1C:
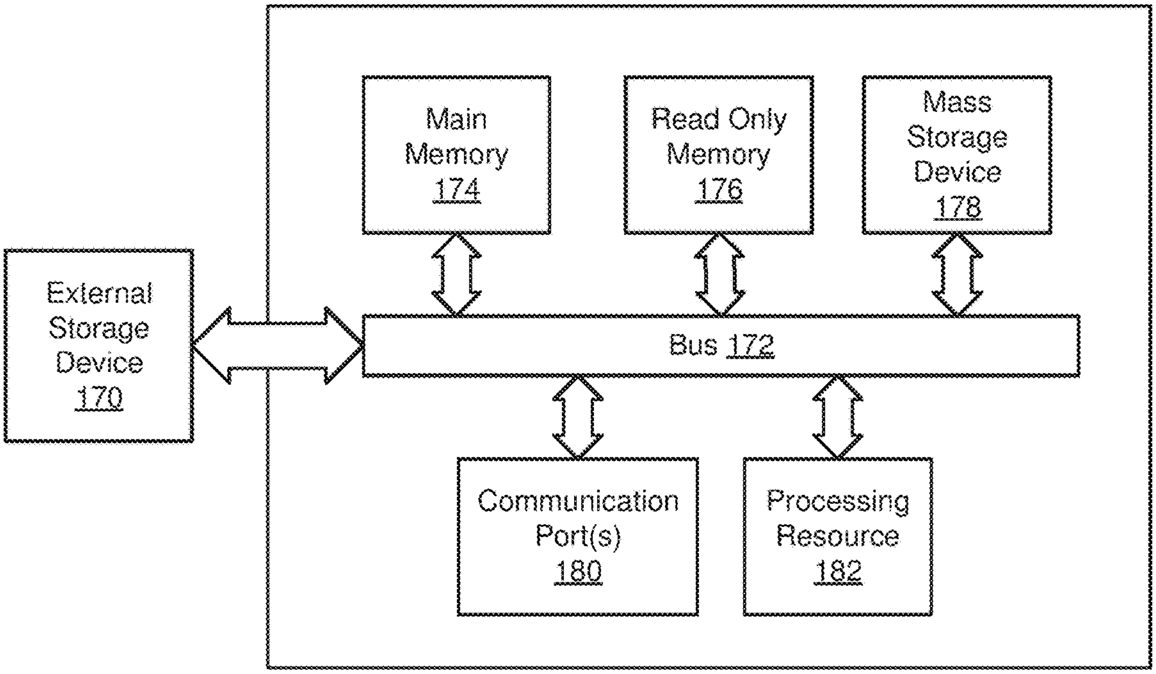
Figure 1B:
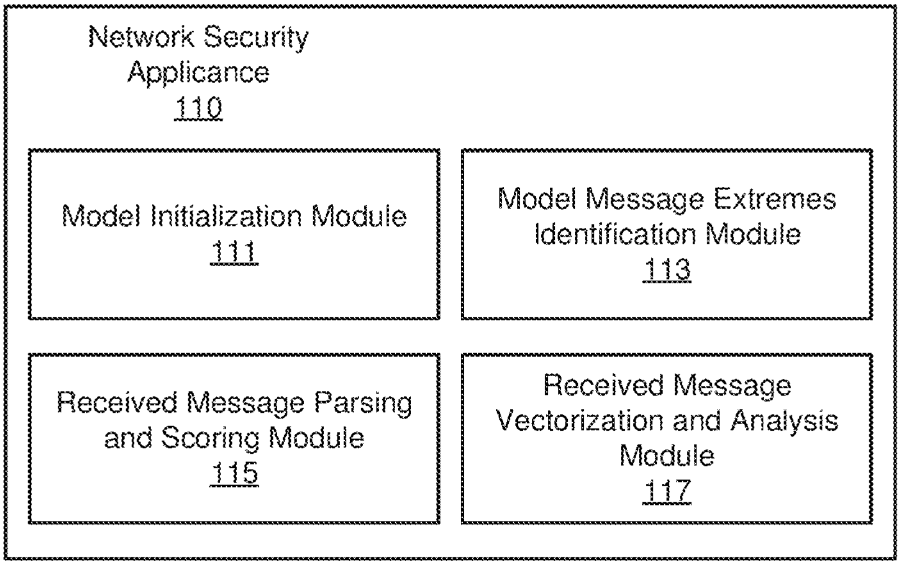

Turning to FIG. 1B, an example implementation of network security appliance 110 is shown in accordance with some embodiments. Among other things, network security appliance 110 includes: a model initialization module 111, a model message extremes identification module 113, a received message parsing and scoring module 115, and a received message vectorization and analysis module 117.

Model initialization module 111 is configured to access a group of model messages from a memory coupled to network security appliance 110. The group of model messages includes a number of messages that have each been identifies as belonging in the same category. Model initialization module 111 selects one of the model messages from the group of model messages. In some embodiments, the model messages in the group of model messages may be processed in any order, and thus which model message is selected first and later is not important. Model initialization module 111 identifies each unique word in the selected model message, and calculates a total word count in the message Model initialization module 111 selected one of the unique words from the selected model message. In some embodiments, the unique words within the model messages may be processed in any order, and thus which unique word is selected first and later is not important. Model initialization module 111 calculates a frequency of the selected unique word in the message (e.g., number of instances of the unique word divided by the total number of words in the message).

Model initialization module 111 calculates a normal exclusion value for the selected unique word. The normal exclusion value excludes, or reduces, the weightage of words that are inconsequential to determining the topic of text without requiring a negative corpus to be present, and is calculated as discussed below in relation to FIG. 3. Model initialization module 111 stores the calculated normal exclusion value to a memory coupled to network security appliance 110. This process is repeated until all unique words from the selected model message have been processed, and all model messages within the group of model messages have been processed. At this juncture, a number of unique words with corresponding normal exclusion values is stored for each model message in the group of model messages.

Model message extremes identification module 113, generates a vector message definition for the group of model messages. The vector message definition includes the normal exclusion value for every unique word that was found during the processing of the model messages. For each model message in the group of model messages, model message extremes identification module 113 forms a model message vector for the particular model message. This process consists of forming vectors with the normal exclusion values for each unique word in the model message in the order set forth in the model vector definition. Where a particular word was not found in the model message but was found in another model message and is therefore represented in the model vector definition, the normal exclusion value for the missing word is set to zero (0) in the model message vector for the particular model message. Model message extremes identification module 113 identifies the fringes of the formed model message vectors. This includes finding the extreme value for all of the model message vectors in both a first dimension and a second dimension. These extreme values define the boundaries of a category represented by the group of model messages, and are used in categorizing later received messages as being included or not included in the category.

Received message parsing and scoring module 115 is configured to receive an incoming message, identify each unique word within the received message, and calculate a frequency of each unique word within the received message. This includes dividing the number of instances of the selected unique model word by the total number of words in the received message. Received message parsing and scoring module 115 calculates a normal exclusion value is calculated for the selected unique word. Again, the normal exclusion value excludes, or reduces, the weightage of words that are inconsequential to determining the topic of text without requiring a negative corpus to be present, and is calculated as discussed below in relation to FIG. 3. Received message parsing and scoring module 115 stores the calculated normal exclusion value for the selected unique word of the received message. The aforementioned process is repeated for each unique word within the received message. At this juncture, each unique word with corresponding normal exclusion values is available in memory for the received message.

Received message vectorization and analysis module 117 is configured to access the normal exclusion values for each of the unique words in the received message, and to create a received message vector for the received message. The received message vector is created by including any calculated normal exclusion values into a vector of the same format as a vector definition that was defined for a particular. Any unique words that are included in the received message that are not included in the vector definition are ignored, and normal exclusion values in the vector for unique words included in the vector definition that are not included in the received message are set equal to zero (0). This process results in a vector extending in two dimensions.

Received message vectorization and analysis module 117 is configured to determine whether the first dimension of the received message vector is less than the extreme of the first dimension for the category. Where the first dimension of the received message vector is less than the extreme of the first dimension for the category, received message vectorization and analysis module 117 is configured to determine whether the second dimension of the received message vector is less than the extreme of the second dimension for the category. Where the second dimension of the received message vector is less than the extreme of the second dimension for the category, received message vectorization and analysis module 117 is configured to identify the received message as included in the category to which it is being compared.

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of any of network security appliance 110, message originating device 105, and/or message receiving device 122.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOCTM system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
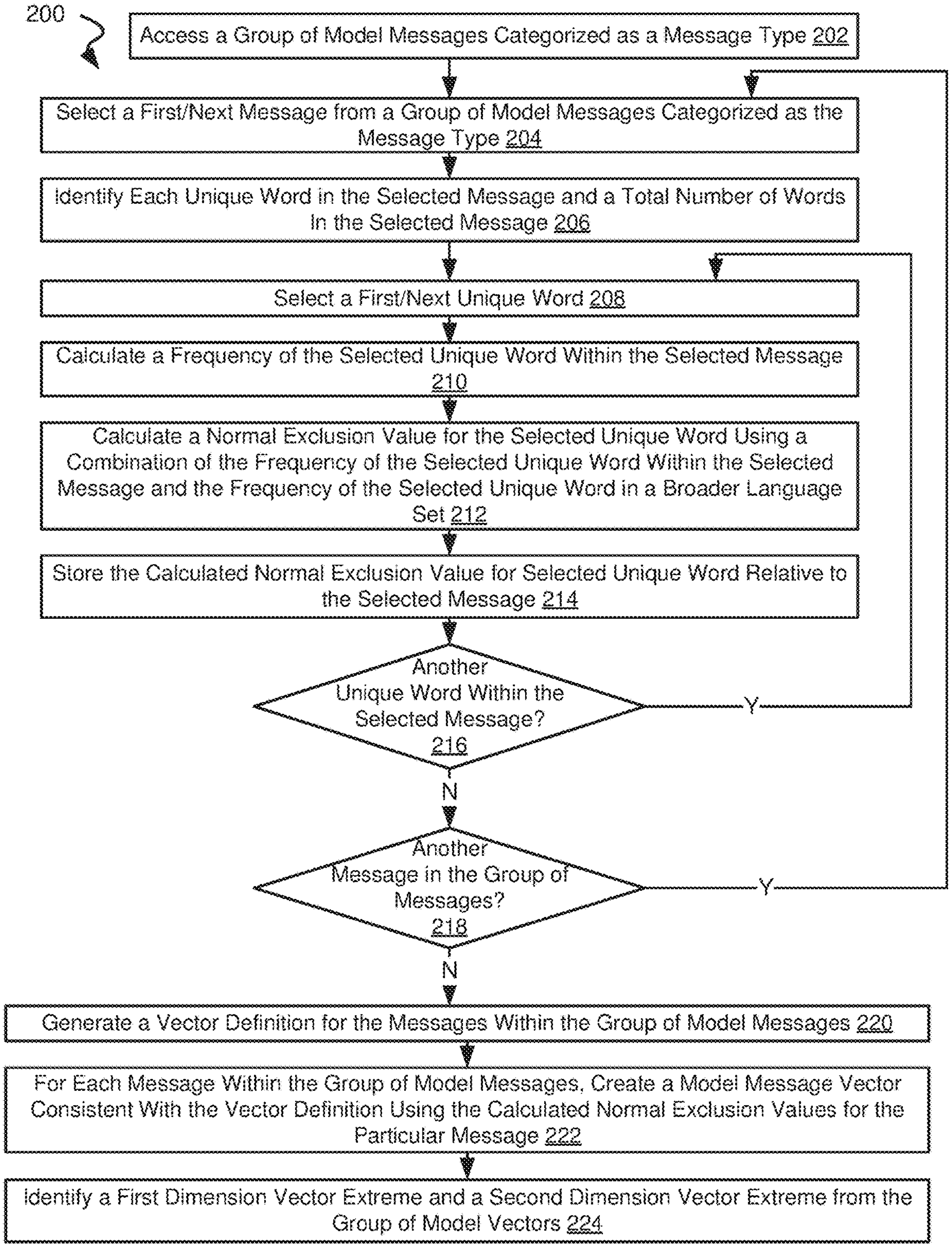
FIG. 2 is a flow diagram showing a method in accordance with various embodiments for generating a machine efficient message categorization model.

Turning to FIG. 2, a flow diagram 200 shows a method in accordance with various embodiments for generating a machine efficient message categorization model. Following flow diagram 200, a group of model messages are accessed (block 202). The group of model messages includes a number of messages that have each been identifies as belonging in the same category. Thus, for example, the group of model messages may include one hundred thousand (100,000) emails that have been identified as spam advertising. As another example, the group of model messages may include one million (1,000,000) text messages that have been identified as phishing. Based upon the disclosure provided herein, one of ordinary skill in the art will recognize a variety of categories into which model messages may be gathered, and/or a variety of numbers of similar messages that may be included in the group of model messages. In some cases, each of the model messages may have at one time be manually identified as included in the category. Alternatively, some of the model messages may have at one time be manually identified as included in the category, while other of the model messages may have been identified as included in the category automatically based upon one or more features of the message. Such features may include, but are not limited to, the sender of the message. Based upon the disclosure provided herein, one of ordinary skill in the art will recognize a variety of ways by which the group of model messages may be selected and/or assembled.

One of the model messages from the group of model messages is selected for processing (block 204). In some embodiments, the model messages in the group of model messages may be processed in any order, and thus which model message is selected first and later is not important. Each unique word in the selected model message is identified, and a total word count in the message is determined (block 206). Using the following message as an example:

Hi John,

How are you today? Just looking to know how you are progressing and if there are any services you still may need from us.

Let us know.

Fred

The number of instances of each unique word is as follows:

hi: 1
john: 1
how: 2
arc: 3
you: 3
today: 1
just: 1
looking: 1
to: 1
know: 2
progressing: 1
and: 1
if: 1
there: 1
any: 1
services: 1
still: 1
may: 1
need: 1
from: 1
us: 2
let: 1
fred: 1 and the total word count is 30. Based upon the disclosure provided herein, one of ordinary skill in the art will recognize that the aforementioned message is merely an example and that any number of other messages with different content may be processed in relation to embodiments discussed herein.

One of the unique words from the selected model message is selected (block 208). In some embodiments, the unique words within the model messages may be processed in any order, and thus which unique word is selected first and later is not important. A frequency of the unique word is calculated (block 210). This includes dividing the number of instances of the selected unique model word by the total number of words in the selected model message. Thus, for example, the frequency of the word "how" in the preceding example message is 2/30, and the frequency of the word "today" in the preceding example message is 1/30.

A normal exclusion value is calculated for the selected unique word (block 212). The normal exclusion value (NE) is calculated in accordance with the following equation:

$$NE = \left|F^{-1}(tpr+\varepsilon) - F^{-1}(\text{Dictionary[selected unique word]}+\varepsilon)\right|,$$

where $F^{-1}$ is an inverse normal cumulative distribution function, tpr is the frequency of occurrence of the selected unique word in the selected message, ε is a small number to prevent the undefined case of $F^{-1}$ (0), and Dictionary [selected unique word] is the frequency of the selected unique word expected in general language use. In some embodiments, "Dictionary [ ]" is the most frequent one third (⅓) million words in the Oxford English Corpus (OEC). The OEC is a dataset that presents all types of the English, from blogs to newspaper articles to literary novels and even social media, sourcing from versions of the English language from the United Kingdom, the United States, Ireland, Australia, New Zealand, the Caribbean, Canada, India, Singapore, and South Africa. These one third (⅓) million words are stored in a table with corresponding frequency data to enable rapid lookup. The frequency for any word that does not appear in the Dictionary [ ] is defined as zero (0). Setting the frequency for missing words at zero (0) is safe as the frequency of words beyond the first one third (⅓) million words in the OEC is negligible.

As the preceding equation for calculating the normal exclusion value describes, the normal exclusion value excludes, or reduces, the weightage of words that are inconsequential to determining the topic of text without requiring a negative corpus to be present. Said another way, unique words that are common in both the text of the selected message and common in the OEC do not substantially impact the normal exclusion value, but words that occur in the selected message and are uncommon in the OEC have considerable impact on the normal exclusion value.

The calculated normal exclusion value for the selected unique word of the selected model message is stored (block 214), and it is determined if any other unique words remain to be processed in the selected model message (block 216). Where additional unique words remain to be processed in the selected model message (block 216), the processes of blocks 208-216 are repeated for the next unique word in the selected model message. These processes are repeated until each of a normal exclusion value has been calculated and stored for each unique word in the selected model message.

Once each of the unique words from the selected model message has been processed (block 216), it is determined whether any model messages within the group of model messages remain to be processed (block 218). Where additional model messages remain to be processed in the group of model message (block 218), the processes of blocks 204-218 are repeated for the next model message in the group of model messages. These processes are repeated until each of model messages in the group of model messages has been processed. Once all messages from the group of model messages has been processed (block 218), a number of unique words with corresponding normal exclusion values is stored for each model message in the group of model messages.

A vector definition is generated for the group of model messages (block 220). The vector message definition includes the normal exclusion value for every unique word that was found during the processing of the model messages. Thus, using the example above and assuming (unrealistically) that all words in all model messages of the group of model messages are limited to those found in the example above except for the finding of the word "cow" in another of the model messages, the vector definition may be as follows:

Model Vector Definition {NE (hi), NE (john), NE (how), NE (are), NE (you),
NE (today), NE (just), NE (looking), NE (to), NE (know), NE (progressing), NE (and),
NE (if), NE (there), NE (any), NE (services), NE (still), NE (may), NE (need),
NE (from), NE (us), NE (let), NE (fred), NE (cow)}.

The order of the normal exclusion values for the unique words found in the model messages is not important.

For each model message in the group of model messages, a model message vector for the particular model message is formed (block 222). This process consists of forming vectors with the normal exclusion values for each unique word in the model message in the order set forth in the model vector definition. Where a particular word was not found in the model message but was found in another model message and is therefore represented in the model vector definition, the normal exclusion value for the missing word is set to zero (0) in the model message vector for the particular model message. Thus, using the preceding example, the NE (cow) position is set to zero (0) in the model message vector as the word "cow" did not occur in the example model message.

Figure 3:
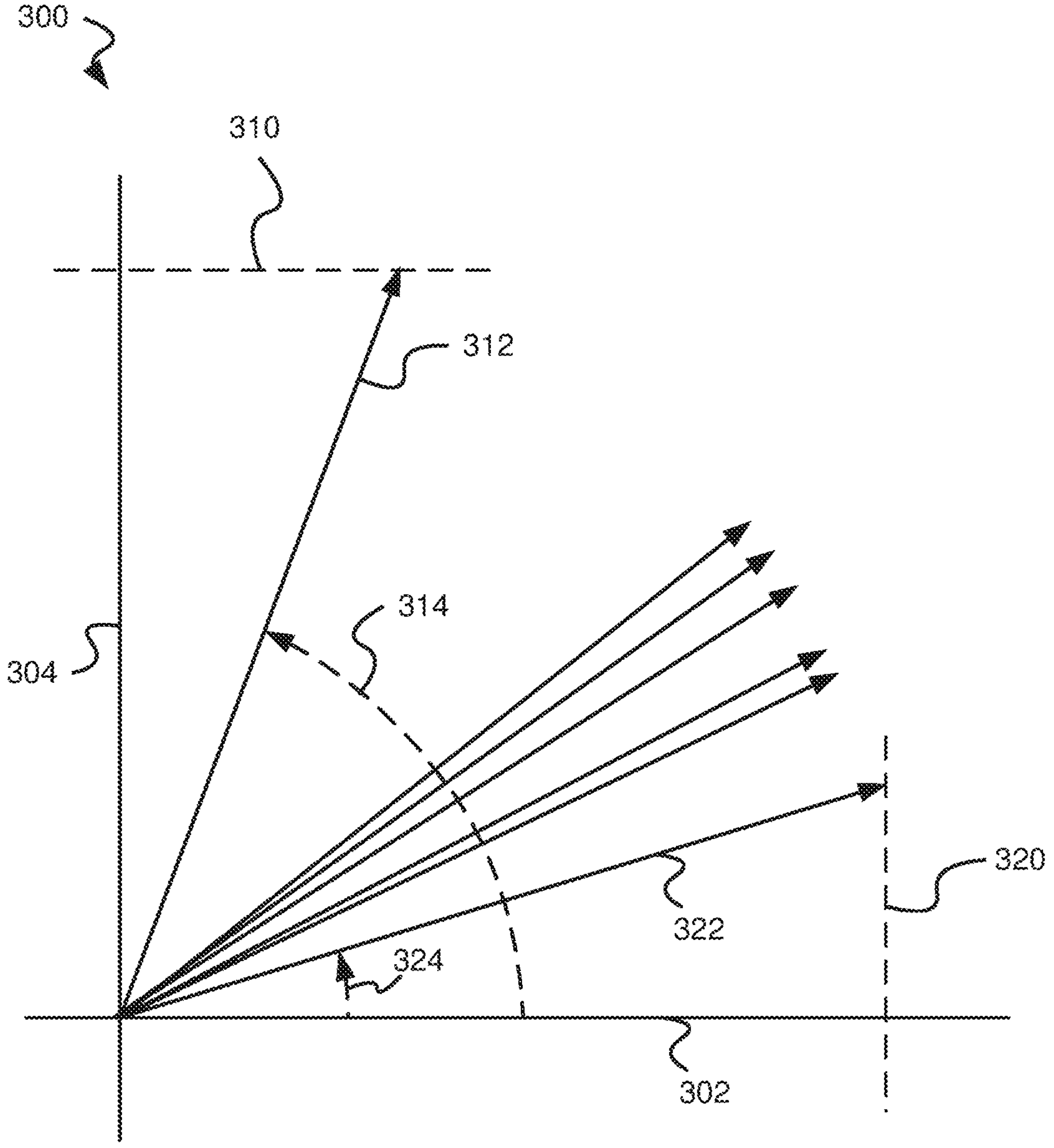
FIG. 3 graphically depicts the process of FIG. 2.

Turning to FIG. 3, a number of model message vectors from an example group of model vectors are graphically shown on a two dimensional graph 300 with a first dimension axis 302 and a second dimension axis 304. As shown in the example, each model message vector represents a different model message of the group of model messages, and because of the different normal exclusion values each model message vector has a different angle measured from first dimension axis 302. A first fringe model message vector 312 has the greatest angle 314 from first dimension axis 302, and a second fringe model message vector 322 has the smallest angle 324 from first dimension axis 302. Any message vector between the fringe model vectors is considered to be of the same category of the group of model vectors. Fringe model message vector 312 is the model message vector having the greatest value 310 along second dimension axis 304, and fringe model message vector 322 is the model message vector having the greatest value 320 along first dimension axis 304.

Embodiments discussed herein identify the fringes of the group of model vectors based upon the greatest value along the respective first dimension axis 302 and second dimension axis 304. Once identified, other message vectors for received messages can be rapidly categorized by determining whether the newly received messages falls between the identified fringes in which case it is considered in the same category, or outside of the identified fringes in which case it is considered not in the same category. A message vector for a received message is considered within the category where both its offset along first dimension axis 302 is less than value 320, and its offset along first dimension axis 304 is less than value 310. In contrast, a message vector for a received message is considered outside the category where either its offset along first dimension axis 302 is greater than value 320, or its offset along first dimension axis 304 is greater than value 310. By reducing comparison of a message vector to a comparison of a defined extreme along first dimension axis 304 and another defined extreme along second dimension axis 302, received messages can be quickly and efficiently categorized.

Returning to FIG. 2, the model message vectors for each of the model messages in the group of model messages are considered to find the fringes of the group of model messages (block 224). This includes finding the extreme value for all of the model message vectors in both a first dimension and a second dimension (i.e., value 310 and value 320 as discussed above in relation to FIG. 3). These extreme values define the boundaries of a category represented by the group of model messages, and are used in categorizing later received messages as being included or not included in the category.

Figure 4:
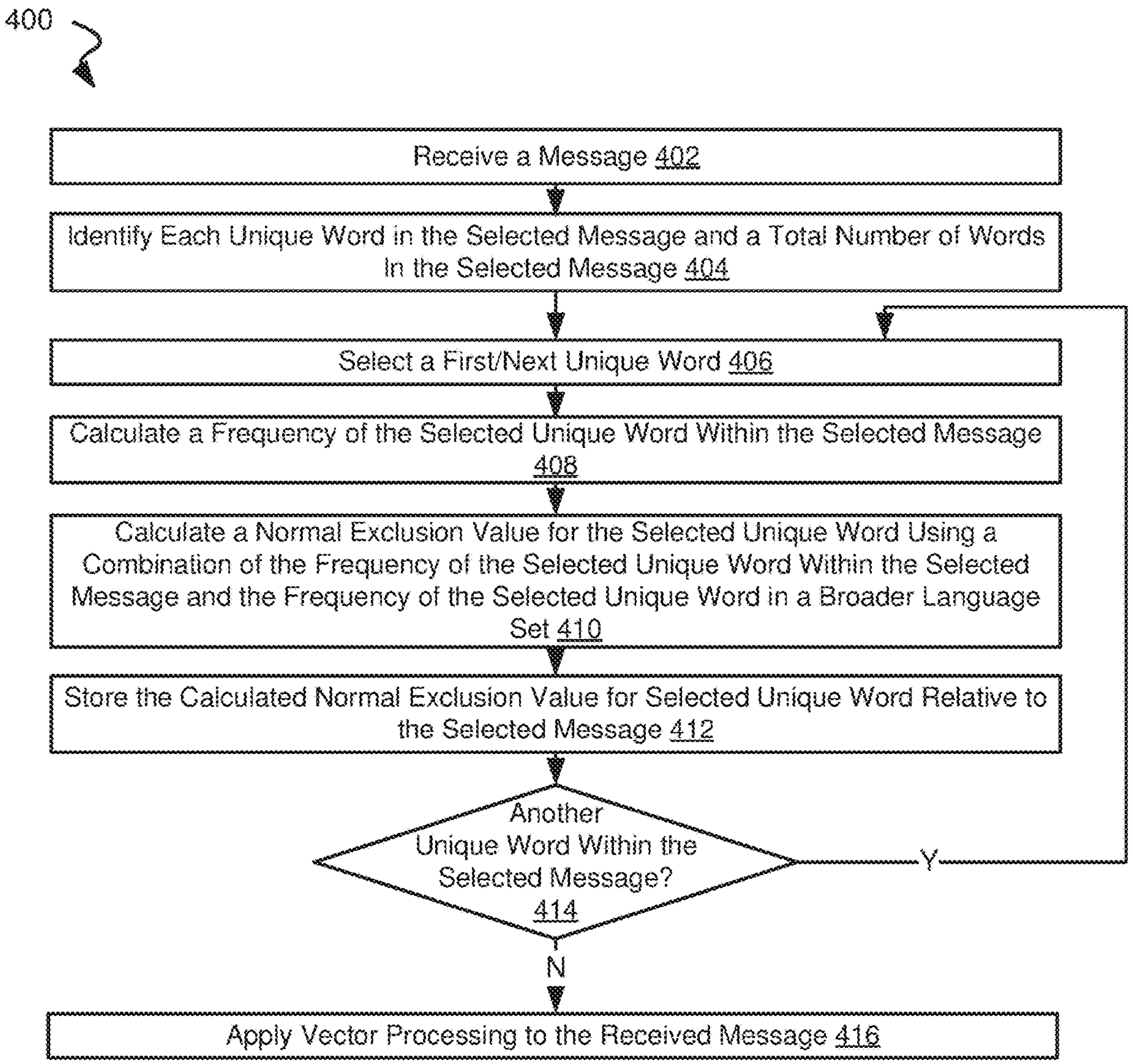
FIG. 4 is a flow diagram showing a method in accordance with some embodiments for generating normal exclusion values for a received message.

Turning to FIG. 4, a flow diagram 400 shows a method in accordance with some embodiments for generating normal exclusion values for a received message. Following flow diagram 400, a message is received (block 402). The message may be any type of message including, but not limited to, a text message or an email message. The message includes content where at least a portion of the content is text.

Each unique word in the selected model message is identified, and a total word count in the message is determined (block 404). One of the unique words from the selected model message is selected (block 406). In some embodiments, the unique words within the model messages may be processed in any order, and thus which unique word is selected first and later is not important. A frequency of the unique word is calculated (block 408). This includes dividing the number of instances of the selected unique word by the total number of words in the received message. Thus, for example, the frequency of the word "how" in the preceding example message is 2/30, and the frequency of the word "today" in the preceding example message is A normal exclusion value is calculated for the selected unique word (block 410). The normal exclusion value (NE) is calculated in accordance with the same equation discussed above in relation to block 212 of FIG. 2. The calculated normal exclusion value for the selected unique word of the received message is stored (block 412), and it is determined if any other unique words remain to be processed in the received message (block 414). Where additional unique words remain to be processed in the received message (block 414), the processes of blocks 406-414 are repeated for the next unique word in the received message. These processes are repeated until each of a normal exclusion value has been calculated and stored for each unique word in the received message. Once each of the unique words from the received message has been processed (block 414), vector processing is applied to the received message (block 416). One embodiment of such vector processing is discussed below in relation to FIGS. 5-8.

Figure 5:
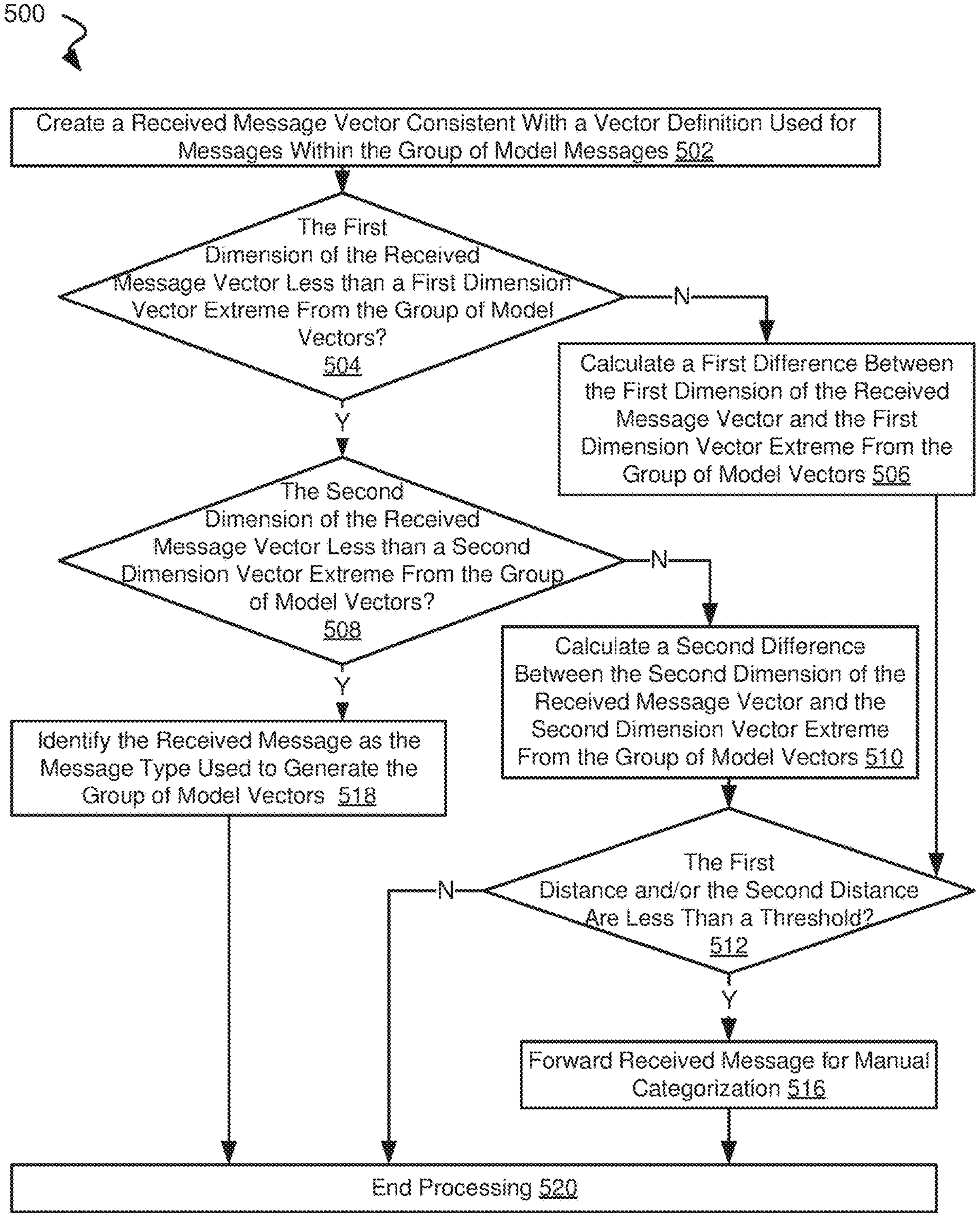
FIG. 5 is a flow diagram showing a method for vectorizing and analyzing a received message in accordance with some embodiments.

Turning to FIG. 5, a flow diagram 500 shows a method for vectorising and analyzing a received message in accordance with some embodiments. Following flow diagram 500, a received message vector is created (block 502). The received message vector is created by including any calculated normal exclusion values (e.g., those calculated and stored in the process of FIG. 4) into a vector of the same format as a vector definition that was defined for a particular category (e.g., into the vector definition created in block 220 of FIG. 2). Any unique words that are included in the received message that are not included in the vector definition are ignored, and normal exclusion values in the vector for unique words included in the vector definition that are not included in the received message are set equal to zero (0). This process results in a vector extending in two dimensions (e.g., first dimension axis 302 and second dimension axis 304).

It is determined whether the first dimension of the received message vector is less than the extreme of the first dimension for the category (e.g., whether the first dimension of the received message vector is less than value 320) (block 504). Where the first dimension of the received message vector is less than the extreme of the first dimension for the category (block 504), it is determined whether the second dimension of the received message vector is less than the extreme of the second dimension for the category (e.g., whether the second dimension of the received message vector is less than value 310) (block 508). Where the second dimension of the received message vector is less than the extreme of the second dimension for the category (block 508), the received message is identified as included in the category to which it is being compared (block 518).

Alternatively, where the first dimension of the received message vector is less than the extreme of the first dimension for the category (block 504), a first difference between the first dimension of the received message vector and the extreme of the first dimension for the category is calculated (block 506). Where this first difference is less than a defined threshold (block 512), the received message is forwarded to be manually considered for inclusion in the category (block 516). This is because the received message is similar to the already defined category. Similarly, where the second dimension of the received message vector is less than the extreme of the second dimension for the category (block 508), a second difference between the second dimension of the received message vector and the extreme of the second dimension for the category is calculated (block 510). Where this second difference is less than a defined threshold (block 512), the received message is forwarded to be manually considered for inclusion in the category (block 516). Again, this is because the received message is similar to the already defined category. Once the message has been processed and categorized (either included or excluded from the category of the group of model messages), processing of the message completes (block 520).

The approach for categorizing discussed above in relation to FIG. 5 is based on the notion of vector similarity. The algorithm assumes that the relevance of one message to another message roughly equal to a document-query similarity. In such an algorithm, the messages are treated as a bag-of-words that are translated to n-dimensional vectors, where each dimension corresponds to a word based on a compiled set of terms known as a vocabulary. Under such models, given category is mapped to a certain subset of the compiled vocabulary. As is appreciated by considering the algorithm of FIG. 5, it is not enough for a message to have a high frequency of words included within the subset to be included in a given category, rather combinations of words are incorporated into the categorization process. As an example, a news article (i.e., a message) regarding COVID-19 and an administration protocol manual on COVID-19 vaccines will both strongly correlate to words such as vaccines, dosages, Pfizer, Moderna, among others. To distinguish between these two topics, the occurrence of additional contextual words such as policy, mandate, and president would play a role in defining the proper category as "news" for the message, and words like intramuscular, angle, deltoid, and subcutaneous would likely exist within a message included in a category "administration protocol manual". While these contextual words will have a lower correlation to a given topic, they are nonetheless important for an effective categorization algorithm. This leads to a high significance of vector orientation within a VSM as it is important to keep track of how a word represented by a certain dimension relates to words represented by different dimensions.

The interdependence between vector space models (VSM) and orientation allows one to assess document similarity solely from the context of vector angles. For example, to rank similarity within a category, a simple and popular mechanism is to calculate the Relevance Status Value which computes the cosine of the angle between the query and each document in the collection. The larger the cosine value, the smaller the angle, and the more similar the documents being compared are. It is noted that while vector magnitude would typically be an important metric both model message vectors and received message vectors are normalized to remove the importance of vector magnitude. As such, message vectors with smaller angles between them are considered more related than vectors with larger angles between them.

The aforementioned suggests that messages of the same category (i.e., the same topic) will have smaller angles between each other than those comprised of different topics altogether. Extrapolating from this, the categorization problem can be reduced to a linear combination problem. In particular, a received message vector is considered between two fringe model message vectors if the sum of its angles to each vector is equal to the angle between the two vectors themselves and it lies on the plane defined by the two vectors. Note this vector can always be calculated as a linear combination of its surrounding vectors. The following algorithm shows an approach based on binary search that allows one to identify the scalar combinations needed to recreate a received message vector. In the algorithm, Here, cossim refers to cosine similarity, the target the received message vector that is being recreated, x and y are the fringe model message vectors, $\beta_x$ and $\beta_y$ are the scalar values such that $x\beta_x+x\beta y$=target.

Algorithm for Finding Linear Combination Scalars
For a Target Vector In-between Two Vectors

```
Result: β_x and β_y
vector_one = x;
vector_two = y;
mid = (vector_one + vector_two)/2 ;
β_x = 1/2;
β_x = 1/2
level = 1;
while mid ≠ target do
   level = level + 1;
   sim_one = cos_sim(vector_one; target);
   sim_two = cos_sim(vector_two; target);
   if sim_one ≥ sim_two then
      mid = vector_two;
      β_x = β_x + 2^-level;
      β_y = β_y − 2^-level;
   else
      mid = vector_one;
      β_x = β_x − 2^-leve1;
      β_y = β_y + 2^-level;
   end
end
```

This conclusion also makes intuitive sense. As discussed earlier, we can identify a document as being from a particular category or topic if it has word combinations that indicate as such. A vector that is a linear combination of those within the corpus must have one or more such identifying word combinations as a result.

It is noted that by linear combinations, it is possible to specifically refer to the set of positive linear combinations. As mentioned earlier, orientation of vectors is important in regards to which messages and word combinations they represent. A negatively scaled vector represents the complete opposite document than a positively scaled counterpart and thus is not used for categorization. Simply stated, a message is of the particular category if its vector representation is within the positive span of the corpus for the category. The aforementioned algorithm can be reduced to the comparison with dimensional extreme values (e.g., value 310 and value 320) derived from a group of model messages for inclusion or non-inclusion in a category as described above in relation to FIG. 5.

Figure 6:
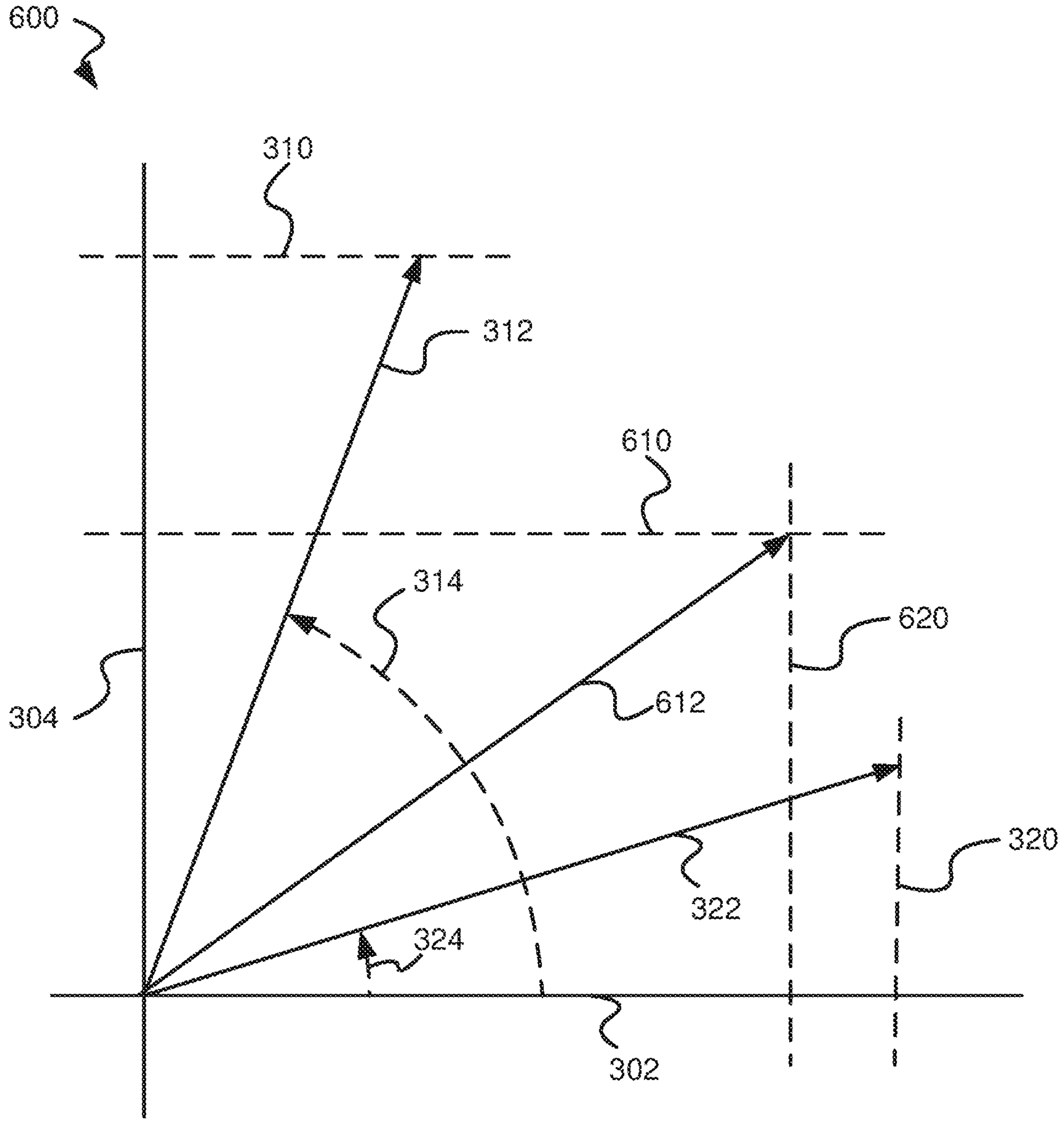
FIGS. 6-8 graphically depict examples of the process of FIG. 5.

Turning to FIG. 6, a graph 600 shows an example of a received message vector 612 where it is included in the category of the group of model messages. As shown, received message vector 612 falls between fringe model message vector 312 and fringe model message vector 322. This is proved where received message vector 612 has a value 620 along first dimension axis 302 that is less than value 320, and a value 610 along second dimension axis 304 that is less than value 310.

Figure 7:
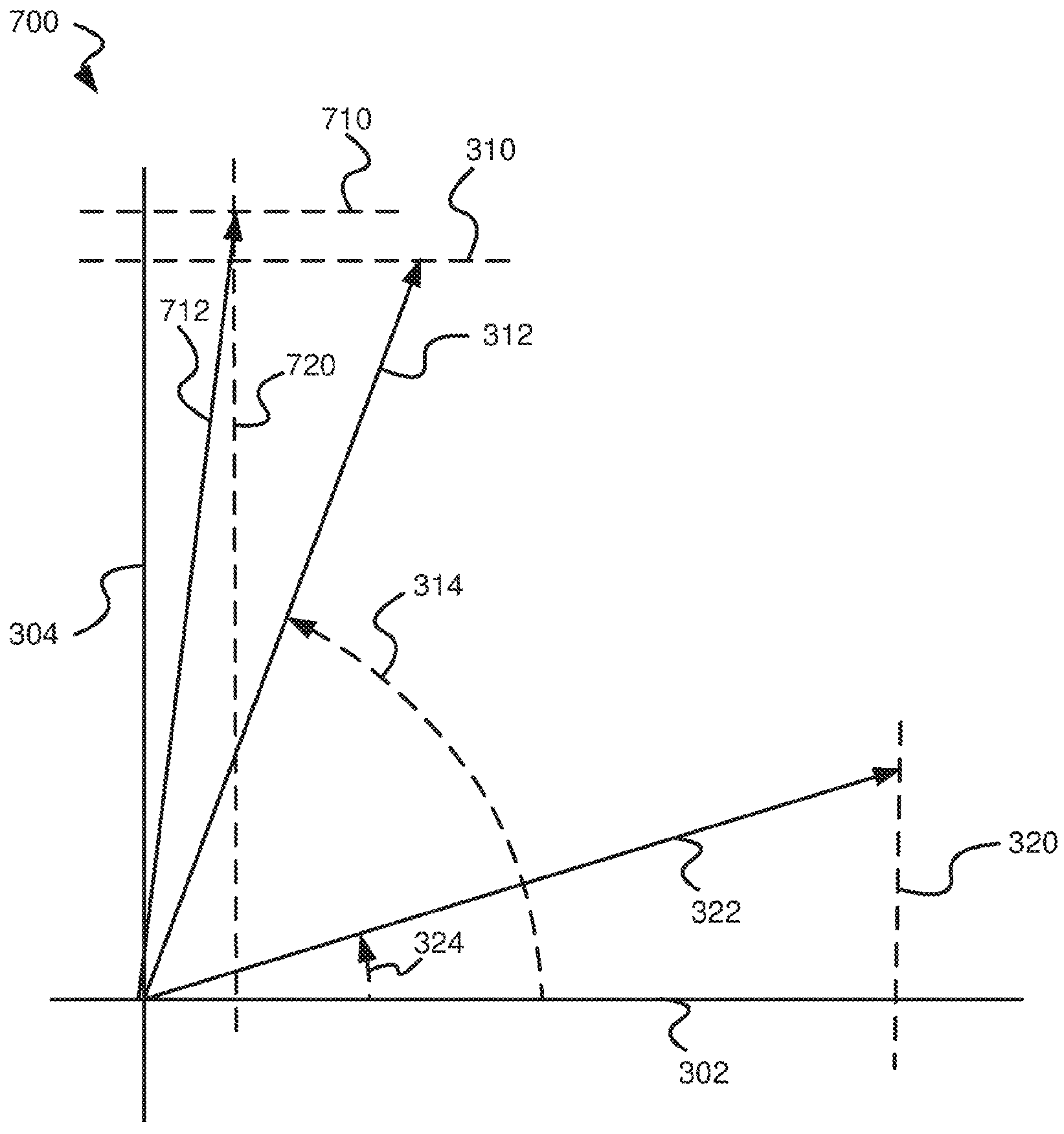

Turning to FIG. 7, a graph 700 shows an example of a received message vector 712 where it is not included in the category of the group of model messages. As shown, received message vector 712 falls outside fringe model message vector 312 and fringe model message vector 322. This is proved where received message vector 712 has a value 710 along second dimension axis 304 that is greater than value 310. The fact that a value 720 of received message vector 712 along first dimension axis 302 is less than value 320 does not change the non-inclusion of received message vector 712 within the category.

Figure 8:
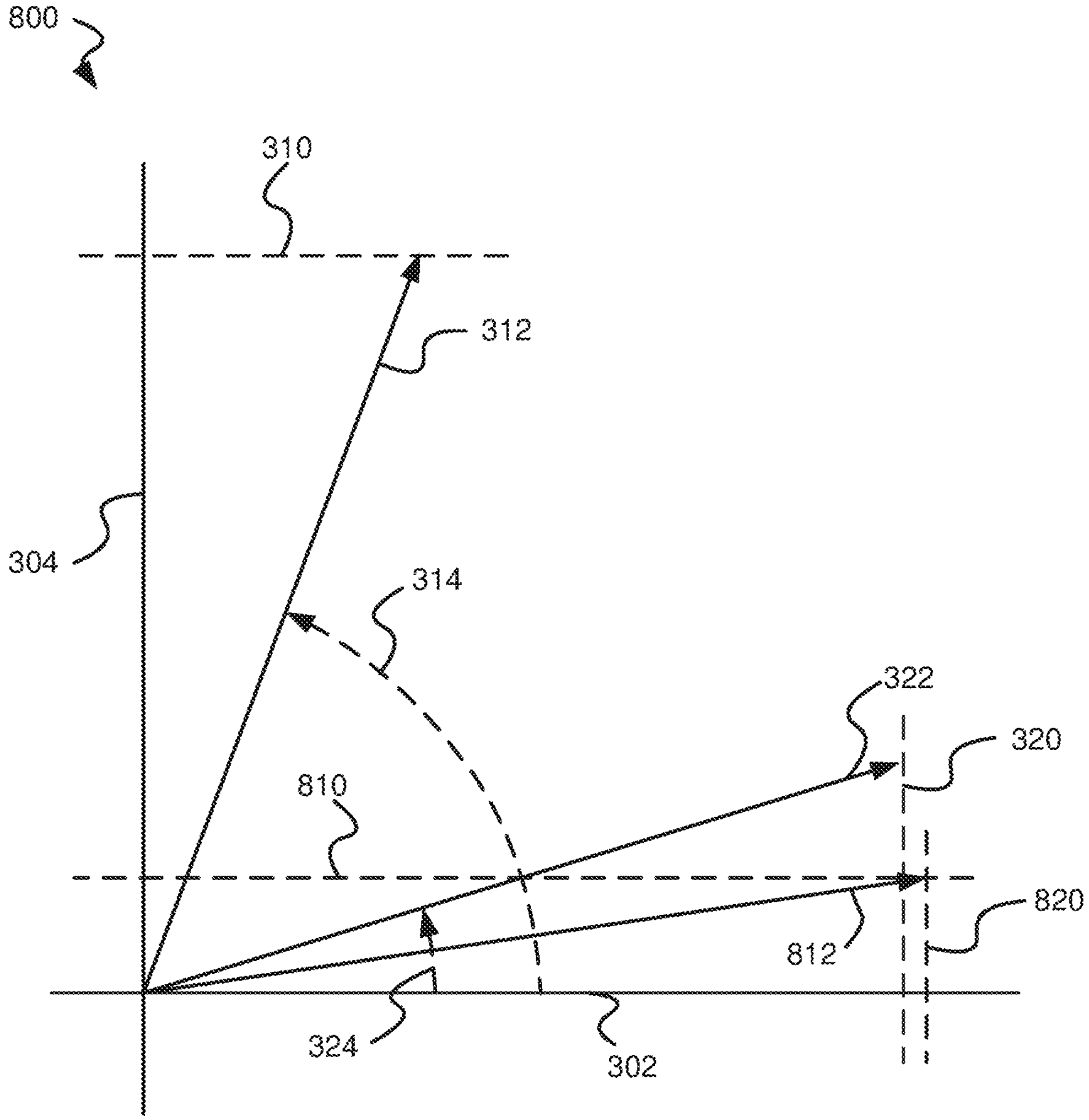

Turning to FIG. 8, a graph 800 shows an example of a received message vector 812 where it is not included in the category of the group of model messages. As shown, received message vector 812 falls outside fringe model message vector 312 and fringe model message vector 322. This is proved where received message vector 812 has a value 820 along first dimension axis 302 that is greater than value 320. The fact that a value 810 of received message vector 812 along second dimension axis 304 is less than value 310 does not change the non-inclusion of received message vector 812 within the category.

What is claimed is:

1. A method performed by a network security appliance, the method comprising:

determining, by a processing resource of the network security appliance, a set of normal exclusion values by for each unique word in each model document of a plurality of model documents that relate to a particular topic, calculating a normal exclusion value for inclusion within the set of normal exclusion values based on a frequency of the unique word in the model document and a frequency of the unique word in a dictionary, wherein each of the plurality of model documents includes text content;

creating, by the processing resource, a plurality of model document vectors by forming for a given model document of the plurality of model documents a vector having a plurality of normal exclusion values from the set of normal exclusion values in which each of the plurality of normal exclusion values correspond to a given unique word in the given model document;

identifying, by the processing resource, a largest value in a first dimension within the plurality of model document vectors as a first topic extreme, and a largest value in a second dimension within the plurality of model document vectors as a second topic extreme;

categorizing, by the processing resource, a document at issue as included within or excluded from the particular topic by creating a vector for the document at issue based on a model vector definition and comparing the vector to one or both of the first topic extreme and the second topic extreme; and filtering, by the processing resource, the document by performing one or more security functions comprising at least one of content filtering, web filtering, or anti-spam.

2. The method of claim 1, wherein the dictionary includes more than one hundred thousand unique words and corresponding frequencies of each unique word of the more than one hundred thousand unique words.

3. The method of claim 1, wherein the dictionary comprises at least a subset of words in the Oxford English Corpus.

4. The method of claim 1, wherein the normal exclusion value is calculated in accordance with the following equation:

$$NE = \left|F^{-1}(tpr + \varepsilon) - F^{-1}(\text{Dictionary[selected unique word]} + \varepsilon)\right|,$$

wherein $F^{-1}$ is an inverse normal cumulative distribution function, tpr is the frequency of the particular unique word in the particular document, ε is a small number to prevent an undefined case of $F^{-1}(0)$, and Dictionary [selected unique word] is the frequency of the unique word in the dictionary.

5. The method of claim 1, the method further comprising generating the model vector definition for the particular topic, wherein forming the vector for the given model document includes ordering the plurality of normal exclusion values of the vector according to the model vector definition.

6. The method of claim 5, wherein the vector definition includes a position for each normal exclusion value for each unique word found across all of the plurality of model documents.

7. The method of claim 1, wherein identifying the largest value in the first dimension includes comparing a first dimension value from each of the plurality of model document vectors.

8. The method of claim 1, wherein identifying the largest value in the second dimension includes comparing a second dimension value from each of the plurality of model document vectors.

9. The method of claim 1, wherein the dictionary is maintained in a look-up table.

10. The method of claim 1, further comprising storing the calculated normal exclusion value to a memory coupled to the processing resource, and repeating until all unique words from a selected model document have been processed and all model documents within the plurality of model documents have been processed.

11. The method of claim 1, wherein the model vector definition is generated for the plurality of model documents, wherein the model vector definition includes the normal exclusion value for every unique word that was found during the processing of the model documents, and wherein creating the vector for the document at issue includes including any calculated normal exclusion values into a vector of a same format as the model vector definition, any unique words that are included in the document at issue that are not included in the model vector definition are ignored, and normal exclusion values in the vector for unique words included in the model vector definition that are not included in the document at issue are set equal to zero (0).

12. A non-transitory computer-readable storage medium embodying a set of instructions, which when executed by a processing resource of a network security appliance, causes the processing resource to:

determine a set of normal exclusion values by for each unique word in each model document of a plurality of model documents that relate to a particular topic, calculating a normal exclusion value for inclusion within the set of normal exclusion values based on a frequency of the unique word in the model document and a frequency of the unique word in a dictionary, wherein each of the plurality of model documents includes text content;

create a plurality of model document vectors by forming for a given model document of the plurality of model documents a vector having a plurality of normal exclusion values from the set of normal exclusion values in which each of the plurality of normal exclusion values correspond to a given unique word in the given model document;

identify a largest value in a first dimension within the plurality of model document vectors as a first topic extreme, and a largest value in a second dimension within the plurality of model document vectors as a second topic extreme;

categorize a document at issue as included within or excluded from the particular topic by creating a vector for the document at issue based on a model vector definition and comparing the vector to one or both of the first topic extreme and the second topic extreme; and filter the categorized document by performing one or more security functions comprising at least one of content filtering, web filtering, or antispam.

13. The non-transitory computer-readable storage medium of claim 12, wherein the dictionary includes more than one hundred thousand unique words and corresponding frequencies of each unique word of the more than one hundred thousand unique words.

14. The non-transitory computer-readable storage medium of claim 12, wherein the dictionary comprises at least a most frequently occurring portion of words in the Oxford English Corpus.

15. The non-transitory computer-readable storage medium of claim 12, wherein the normal exclusion value is calculated in accordance with the following equation:

$$NE = \left|F^{-1}(tpr + \varepsilon) - F^{-1}(\text{Dictionary[selected unique word]} + \varepsilon)\right|,$$

wherein $F^{-1}$ is an inverse normal cumulative distribution function, tpr is the frequency of the particular unique word in the particular document, ε is a small number to prevent an undefined case of $F^{-1}(0)$, and Dictionary [selected unique word] is the frequency of the unique word in the dictionary.

16. The non-transitory computer-readable storage medium of claim 12, wherein the instructions further cause the processing resource to generate the model vector definition for the particular topic, wherein forming the vector for the given model document includes ordering the plurality of normal exclusion values of the vector according to the model vector definition.

17. The non-transitory computer-readable storage medium of claim 12, wherein the vector definition includes a position for a subset of each normal exclusion value for each unique word found across all of the plurality of model documents.

18. The non-transitory computer-readable storage medium of claim 12, wherein identification of the largest value in the first dimension includes comparing a first dimension value from each of the plurality of model document vectors.

19. The non-transitory computer-readable storage medium of claim 12, wherein identification of the largest value in the second dimension includes comparing a second dimension value from each of the plurality of model document vectors.

20. The non-transitory computer-readable storage medium of claim 10, wherein the dictionary is maintained in a look-up table.

21. A network security system comprising:

a processing resource; and a non-transitory computer-readable medium, coupled to the processing resource, having stored therein instructions that when executed by the processing resource cause the processing resource to:

determine a set of normal exclusion values by for each unique word in each model document of a plurality of model documents that relate to a particular topic, calculating a normal exclusion value for inclusion within the set of normal exclusion values based on a frequency of the unique word in the model document and a frequency of the unique word in a dictionary, wherein each of the plurality of model documents includes text content;

create a plurality of model document vectors by forming for a given model document of the plurality of model documents a vector having a plurality of normal exclusion values from the set of normal exclusion values in which each of the plurality of normal exclusion values correspond to a given unique word in the given model document;

identify a largest value in a first dimension within the plurality of model document vectors as a first topic extreme, and a largest value in a second dimension within the plurality of model document vectors as a second topic extreme;

categorize a document at issue as included within or excluded from the particular topic by creating a vector for the document at issue based on a model vector definition and comparing the vector to one or both of the first topic extreme and the second topic extreme; and filter the categorized document by performing one or more security functions comprising at least one of content filtering, web filtering, or antispam.

22. The network security system of claim 21, wherein the normal exclusion value is calculated in accordance with the following equation:

$$NE = \left|F^{-1}(tpr + \varepsilon) - F^{-1}(\text{Dictionary[selected unique word]} + \varepsilon)\right|,$$

wherein $F^{-1}$ is an inverse normal cumulative distribution function, tpr is the frequency of the particular unique word in the particular document, ε is a small number to prevent an undefined case of $F^{-1}(0)$, and Dictionary [selected unique word] is the frequency of the unique word in the dictionary.

* * * * *